Figure 1:
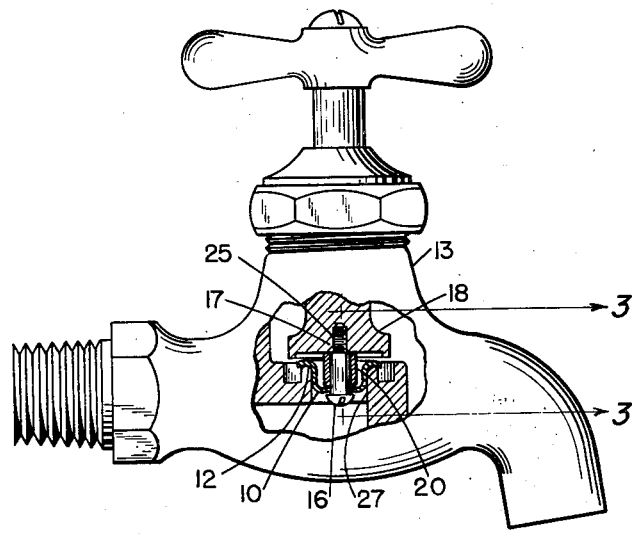

July 15, 1952  H. R. HARDING  2,603,446
VALVE WITH DOUBLE-ACTING WASHER
Filed Dec. 17, 1948

*INVENTOR.*
HIRAM R. HARDING

BY *Howard J. Whelan*
ATTORNEY

Patented July 15, 1952

2,603,446

UNITED STATES PATENT OFFICE 2,603,446

VALVE WITH DOUBLE-ACTING WASHER

Hiram R. Harding, Baltimore, Md., assignor of fifty per cent to Harry E. Karr, Baltimore County, Md., and twenty-five per cent to Logan C. Harding, Hopewell, Va.

Application December 17, 1948, Serial No. 65,771

3 Claims. (Cl. 251—27)

This invention relates to the control of flowing liquids in piping, and more particularly to the washers used on the seats of valves, to make them tight.

In the conventional spigot and other domestic valves of the globe valve type, the fluid flowing through is controlled by screw pressure exerted by a machined head on a stem or spindle having a washer attached to its face, on to a recessed seat in the body of the valve. The washer itself is used as a cushion to make up for the lack of tightness of the seat and head, and after a relatively short active period, becomes so worn and deformed that it leaks. Such leaks cause a great loss of water or whatever fluid is controlled, and make the use of the valve in that condition expensive to keep and unsatisfactory in operation. The cost is not in the valve structure itself but in the waste induced by it. Also the greater effort required to close the valve tight involves more time and stress than desirable on everything concerned in its use. Such washers are usually made of hard rubber, fibre or composition of a similar nature, which cannot withstand much continuous use without wearing down appreciably and cause the spigot or valve to leak. This invention avoids the use of the conventional washer and in its place employs one of thin flexible metal, or material, capable of standing the same stresses. The new washer is formed so that pressure on its middle portion will compress it so its periphery is expanded radially to fit tightly against the inner rim surface of the seat in addition to the rolled surface bearing on the upper surface of the valve seat, when used in the same general way as the common washer.

It has among its objects to provide a new and improved washer unit for valve seating that will avoid one or more of the disadvantages and limitations of the prior art.

Another object of the invention is to provide a new and improved washer unit for valve seating that will work effectively and wear for an exceptionally long period of use.

A further object of this invention is to provide a new and improved washer unit made of material that is thin and capable of being formed from sheet metal and the like and quickly produced in large quantities at low cost.

An additional object of the invention is to provide a new and improved washer unit that may be readily installed or removed, be light, and of a type that can be packed and shipped inexpensively.

An additional object of the invention is to provide a new and improved washer unit that seals the top of the valve or spigot seat on first contact and on further pressure forms an additional seal on the inner throat of the seat.

Other objects of the invention will become apparent as it is more fully described.

In order to explain the invention more clearly, reference is made to the accompanying drawings, wherein a particular form of the invention is illustrated. These drawings in conjunction with the following description bring out the principles and operation of the device, while the claims emphasize the scope of the invention.

Figure 2:
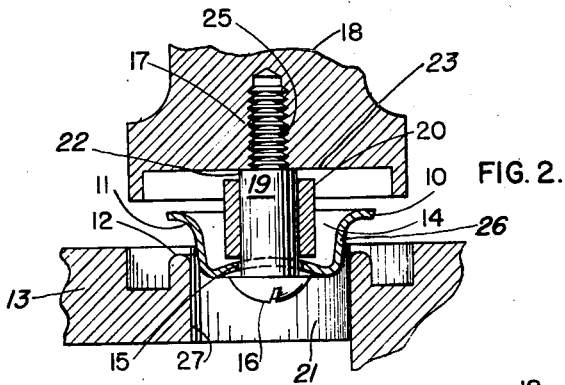
Figure 4:
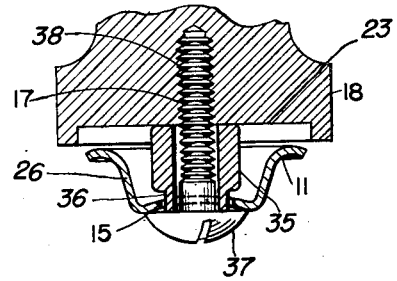
Figure 3:
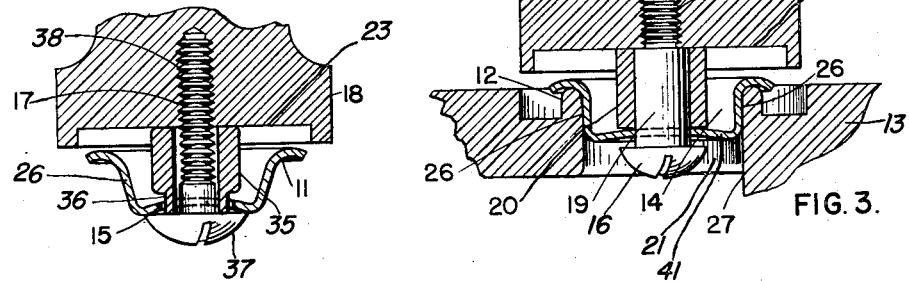

Referring to the drawings:

Figure 1 is a side elevation of a spigot with parts broken away to show a washer and spacer unit embodying this invention, Figure 2 is an enlarged view of a spindle and spigot seat shown in open position, Figure 3 is a similar view to that shown in Fig. 2, but in closed position, and Figure 4 shows a modified form of spacer unit attached to a spindle.

Similar reference characters refer to similar parts throughout the drawings.

In the particular construction shown in the drawings, a thin cupped shaped circular washer 10 of springy material is indicated with its peripheral portion upset to provide a downwardly pending roll or gutter 11 of sufficient depth and width to overlap the conventional wall surface 12 of a spigot body 13 to create a watertight seal therebetween. Its central area 14 is circumscribed by the roll or gutter 11 and has depending angularly formed walls 26 which connect with a bottom 41 that is concaved inwardly and upwardly a slight extent so that pressure on the bottom 41 will cause the lower end on the wall 26 to be forced outwardly. A central hole 15 is located in the bottom 41 and is made suitable for the insertion of the enlarged portion 19 of a machine screw 16 to pass through it so the smaller threaded portion 25 will fit into the screw-threaded passage 17 in the spindle 18 of the spigot. A spacer 20 is positioned on the enlarged portion 19 of the screw 16 and acts to prevent the washer 10 from sliding along the enlarged portion 19. A modified form of spacer 35 is provided with an undercut portion 36 to fit in the hole 15 of the washer to allow a restricted movement of the washer on the undercut portion 36 both laterally and rotatively and allow the use of a standard bolt 37 having threads 38 for fitting into threads 17 and allow the spacer to be held tightly between the face of the spindle and bolt head.

When the spindle 18 is screwed down to close off the spigot, it moves the washer 10 until its roll or gutter 11 sets over the wall surface 12 and seats tightly thereon. Continuing the pressure of the spindle 18 on the washer 10 as the latter is obstructed against downward movement by the wall surface 12, the spacer 20 or 35 forces the central area of the bottom 41 and its edges and walls of the washer 10 into the seat space 21, and partially flattening out the concavity of bottom 41 causes the angular walls 26 to bind tightly against the inner wall 27 of the seat. Both the engagement of the walls 26 with the inner wall 27 and the gutter 11 with the wall surface 12 serve to bind on the seats and makes it doubly watertight.

The device while simple is effective. The whole washer unit turns about the axial central line of the spindle because the undercut portion 36 is long enough to prevent its binding, and the portion 19 of the screw 16 is long enough to permit a slight spacing 22 between the top of the spacer 20 and the bottom surface 23 of the spindle 18, without effecting its leakage proof characteristics. The assembly of the unit is relatively easy requiring only a screwdriver for its attachment. It is also not necessary to take the case required in the use of other types of washers, as the gutter and central area of the unit make all necessary adjustments required to make it water tight. As the washer can rotate it enables it to change its rotative position and take up on wear that may occur in the use of the device and lengthen its period of utility.

While but two general forms of the invention are shown in the drawings and described in the specification, it is not desired to limit this application for patent to these particular forms as it is appreciated that other forms of construction could be made that would use the same principles and come within the scope of the appended claims.

Having thus described the invention, what is claimed is:

1. In a valve, the combination with a valve seat having a cylindrical opening therein and a valve stem to control flow through said opening, of a thin flexible washer generally tubular in shape, said washer having flaring side walls adapted to slide within the opening upon closing of the valve, said side walls having an upper outspread circular rim adapted to be pressed against the valve seat upon closing of the valve, the side walls of the tubular flexible washer having an inturned lower dished-in portion forming a bottom wall, said bottom wall having a hole therein, a screw extending through the said hole and connecting the dished-in portion with the valve stem, whereby the bottom wall flattens out when the valve is closed and the flaring side walls are forced to assume the cylindrical shape of the cylindrical opening in the valve seat.

2. The combination set forth in claim 1, said screw means consisting of a screw depending from the valve stem and having a head and a threaded steam, and a hollow spacer about said stem extending between the screw head and the valve stem.

3. The combination set forth in claim 1, said screw means consisting a screw having a head and a threaded stem and a hollow spacer about said stem extending between the screw head and the valve stem, said spacer having an outer shoulder received in the opening in the aforesaid dished-in portion of the washer.

HIRAM R. HARDING.

REFERENCES CITED

The following references are of record in the file of this patent:

UNITED STATES PATENTS

| Number | Name | Date |
|---|---|---|
| 258,019 | Christ | May 16, 1882 |
| 413,518 | Jones | Oct. 22, 1889 |
| 908,138 | Ricksecker | Dec. 29, 1908 |
| 909,789 | Hawkes | Jan. 12, 1909 |
| 1,077,457 | Delany | Nov. 4, 1913 |
| 1,514,233 | Searles | Nov. 4, 1924 |
| 1,718,350 | Greenwald | June 25, 1929 |
| 1,910,994 | Joyce | May 23, 1933 |
| 2,330,881 | Gora | Oct. 5, 1943 |